United States Patent [19]

Modeste et al.

[11] Patent Number: 5,852,800
[45] Date of Patent: Dec. 22, 1998

[54] METHOD AND APPARATUS FOR USER CONTROLLED MODULATION AND MIXING OF DIGITALLY STORED COMPRESSED DATA

[75] Inventors: A. Robert Modeste, East Palo Alto; Gerald W. Kearby, Redwood City, both of Calif.

[73] Assignee: Liquid Audio, Inc., Redwood City, Calif.

[21] Appl. No.: 546,438

[22] Filed: Oct. 20, 1995

[51] Int. Cl.⁶ .............................. G10L 3/02; G10L 9/00; H04B 1/00
[52] U.S. Cl. ............................................ 704/211; 381/119
[58] Field of Search ................................ 395/2.2, 2.14; 381/17, 119; 84/609, 610

[56] References Cited

U.S. PATENT DOCUMENTS

| | | | |
|---|---|---|---|
| 5,142,656 | 8/1992 | Fielder et al. | 381/37 |
| 5,212,733 | 5/1993 | DeVitt et al. | 381/119 |
| 5,274,740 | 12/1993 | Davis et al. | 395/2.29 |
| 5,347,509 | 9/1994 | Goldberg et al. | 369/275.3 |
| 5,394,477 | 2/1995 | Zampini et al. | 381/119 |
| 5,402,499 | 3/1995 | Robison et al. | 381/119 |
| 5,444,676 | 8/1995 | Balsamo et al. | 381/119 |
| 5,521,981 | 5/1996 | Gehring | 381/17 |
| 5,539,145 | 7/1996 | Kuribayashi et al. | 84/602 |
| 5,627,335 | 5/1997 | Rigoppulos et al. | 84/635 |

OTHER PUBLICATIONS

Charles Platt, *Electrosphere, Music on Demand,* "Wired Magazine", Aug. 1995.

Peter W. Mitchell, *The Sonic Revolution Is Here, And You're Surrounded,* "Stereophile Guide to Home Theater", vol. 1, No. 2, 1995, Issue No. 2, ISSN #1079–6231, pp. 60–61, 63–65, 67–69, 71.

Harold Hahn, *CD–ROM? The Naked Truth and Killer Applications,* 1994 Abacus, ISBN 1–55755–266–5, pp. 11–22, 26–32, 190–211.

Michael Nadeu, *The BYTE Guide to CD–ROM,* "CD–ROM Standards", 1994, Osbourne McGraw–Hill, ISBN 0–070881982–2, pp. 10–11, 56–57.

Mark F. Davis, *The AC–3 Multichannel Coder,* Dolby Technical Papers, Pub No. S93/9951, pp. 1–7.

Studer Professional Audio Equipment, Advertisement, Dyaxis II, *Plug & Play, Optical Interchange for DYAXIS II.*

David Bowie, *Jump, The David Bowie Interactive CD–ROM,* CD–ROM Cover, "ION", BMG Distribution, ISBN 1–885245–00–9.

*Primary Examiner*—Richemond Dorvil
*Assistant Examiner*—Patrick N. Edouard
*Attorney, Agent, or Firm*—Fenwick & West LLP

[57] ABSTRACT

A method and apparatus for generating a summation signal by programmably modulating the intensity levels of a plurality of associated channels of a selection and combining the modulated segments into a unified digital record. A pre-established and user modifiable set of channel intensity levels is provided to the user as a manufacturer recommended modulation and mixing pattern. The user creates, personalizes and subjectively improves sets of channel intensity levels from the basis of default or pre-established patterns and thus produces unique and customized summation signals. A system operator individually adjusts the relative intensity levels of each of a plurality of channels. Each channel is played at default or pre-established intensity, solely and individually, or completely masked, or at a specific relative intensity as programmed by the system operator. Intensity value sets are stored for later access, whereby the operator recreates a previously programmed summation signal. Digitized records from external origins, to include remotely transmitted data and Internet sources, and digital data received from read only memory media are processed solely or in various combinations to generate single source and hybrid summation signals.

6 Claims, 16 Drawing Sheets

Decode/Mixing Process

CD-ROM

Decode/Mixing Process

Comparison to Current Process

FIG. 5  System Software Flowchart

System Software Screen

Transport Window

Multi-language Utility

Type A

Type B

Type C

Type D

Type E

Type F

Type G

Type H

METHOD AND APPARATUS FOR USER CONTROLLED MODULATION AND MIXING OF DIGITALLY STORED COMPRESSED DATA

BACKGROUND—FIELD OF INVENTION

The present invention relates in general to user controlled modulation, mixing and processing of data received from either read only memory sources exclusively or from one or more alternate or separate sources, or of combinations of data received from read only memory media with data received from one or more alternate or separate sources.

BACKGROUND—DISCUSSION OF PRIOR ART

The current environment of rising consumer sophistication in the electronic publishing market, in combination with the rapid proliferation and expanding capabilities of the newer generations of personal computer (PC) and multimedia systems are outmoding conventional product philosophies in all media publishing industries. The music, entertainment, video, educational and multimedia industries have traditionally striven to publish and provide a prescribed and selected version of an artistic or intellectual effort in mass quantities to the consumer at an acceptable price. The modern consumer's appetite for producer formatted, single version and conceptually inflexible musical, entertainment, educational and multimedia documents is, however, presently evaporating.

The consumer market reacts favorably to products offering increased participation in the processing and generation of musical and multimedia production by and for the individual customer. Today's consumer of electronic media products is increasingly sensitized to the potential of having more control, via the growth in power of commercially available PC products, of the precise form in which a musical or multimedia product is played and experienced.

The accessibility of the Internet by tens of millions of consumers, and the growing awareness in the marketplace of the consumer data product transmission capabilities of telephone and cable television networks, are educating both the consumer and the electronic product publishing industry as to the existence of numerous data pathways for the delivery of audio and multimedia titles, shows and presentations in consumer interactive formats.

The application and conventional use of optical compact disc (CD) technology is but one, albeit highly relevant, example of a conventional technology poorly applied by the electronic publishing industry. Conventional applications of the CD are made in weak and limited consideration of the power of the CD media itself, the data storage, data access and data transmission capabilities of the Internet, and the inherent data control potential of conventional consumer electronics systems, products, and particularly of the newer PC models.

Read only memory products have long been essential to the publishing, music, film, multimedia and entertainment industries in the wide dissemination of recorded versions of artistic, musical, video and multimedia works. Over the past ten years, optical read only memory media (e.g. Compact Discs, or CD's) have been established as a standard medium for music publishing.

The capability of read only memory to reliably deliver a particular version of a complex aesthetic work to a wide audience is well known and rightly valued. Conventional techniques used to maximize the performance of CD's in light of that medium's inherent parametric limitations (e.g. storage capacity, transfer speed and data throughput rates) significantly restrict the degree of creative data interactions, to include musical playback interactions, delivered to the consumer to date. These essentially technique based restrictions are an impediment to truly interactive musical experiences in that conventional methods do not provide the user with the capability to either control or interact with the individual components of a musical composition.

CD's used as digital data storage media, typically referred to as Compact Disc-Read Only Memory (CD-ROM), have become the defacto standard in digital data publications, to include multimedia titles. The CD's popularity in both music and data publication is attributable to many factors, including its data storage capacity, physical compactness, durability, and low-cost in mass production.

Despite the previously mentioned limitations, CD-ROM music publishers are exploring the value of including video and textual data in standard CD-ROM products for sale to the mainstream consumer music market. Though the currently available degrees of performance offered by the CD-ROMs is in general capable of meeting the existing expectations of the consumer market, several ambitious musical experimentalists are currently attempting to more fully exploit the power of CD-ROM technology to deliver more deeply involving multimedia entertainment experiences to their target audiences.

A laser disc system currently under manufacture by Pioneer, Mitsubishi and Yamaha corporations constitutes one set of relevant prior art. Laser disc systems of this type access an optical disc containing 5.1 channels of Dolby AC-3 compressed digital audio data. The 5.1 channel group is composed of five full bandwidth audio data channels and one reduced bandwidth woofer channel (i.e. the '0.1" channel).

The electronic components of the 5.1 channel laser disc systems include a laser disc player, a Dolby AC-3 decoder and a special stereo receiver with additional amplifiers. The user is not enabled with any ability to control the nature of the summation signal in any embodiments of this type of prior art. Some of these kinds of systems do, however, incorporate a fixed matrix that allows the six (i.e. five plus a woofer channel) to be mixed down to a stereo output. These multi-channel systems are inherently fixed and pre-set in nature, and do not allow user control within the process of generation of the summation signal. Reference is made to an article entitled "The Sonic Revolution Is Here, and You're Surrounded, as published in Vol. 1 No. 2, 1995 of Stereophile Guide to Home Theater.

Peter Gabriel's release entitled "Xplora 1", and Prince's "Interactive" are two recent examples of CD-ROM recordings which include versions of multi-channel playback. Of particular note, David Bowie's "Jump" has the ability to detect the speed of the processor and the speed of the CD-ROM drive and then deliver up to 8 channels of mixable playback depending the system capabilities. This particular CD method has a performance limitation in that the audio is lower sound quality (8 bit resolution), has limited frequency response (11 KHz maximum frequency and 22 KHz sampling rate), does not possess digital signal processing functions such as Equalization or Chorusing, and does not include the ability to optionally add external sound sources to the summation signal. Additionally, neither of these examples utilize compressed audio storage to contribute to the summation signal.

Music CD publishers are also exploring the value of including video and textual data in standard CD audio products that are meant for sale to the mainstream musical recording consumer market. These products have been called "Enhanced stamped multi-session CDs" or "CD Plus". Examples of this type of commercial offering include Sarah McLachlan's "The Freedom Sessions", Kate Wallace's "Honest", and upcoming releases from Bob Dylan, Willie Nelson, Randy Newman and James Taylor.

CD Plus titles have limited audio capability, lower sound quality (8 bit resolution), and are further restricted by having a reduced space allocation given that most of the data is formatted as Red Book CD audio (IEC 908).

Most published CD-ROM's are data formatted under the guidelines found in the "Yellow Book" convention as defined the International Standards Organization (ISO) and found in their standard ISO/IEC 10149:1995. The recording of compressed two-channel stereo audio, video and graphics onto a CD-ROM in an ISO approved format is becoming an increasingly common practice. This has been done through the introduction of additional industry standard formats (e.g. White Book, Blue Book) and through clever programming by the content providers.

There are non-optimally addressed limitations in conventional CD-ROM based products that have been an impediment to wider market acceptance of these multimedia efforts. One significant limitation is that the amount of storage space needed to accomplish the task of multi-channel playback limits the amount of playable audio. As more space is taken by the additional tracks that fully comprise each given song, overall audio storage or playing time is diminished with this approach.

A second area of limitation includes the varying performance restrictions of commonly available computer system hardware platforms where processing capabilities range from 20 millions of instructions per second, or MIPs, to 110 MIPs and where CD-ROM players range in speed from two to six times speed. Also, specific models of CD-ROM players may not have the ability to read the newer standard types of discs such as "stamped multi session".

A third limitation of multimedia computers has been the prohibitive cost of purchasing the additional hardware needed to provide multimedia multi-channel sound processing. The only multi-channel sound processing cards currently available on the market are priced for professional applications. These products are currently price prohibitive in the wider consumer market.

The nature of recent technological advances in PC and PC peripheral products available for sale to the consumer electronics market is, however, fundamentally expanding the capabilities of end-user consumers to process, personalize and customize the musical, video, multi-media and entertainment in the mass market environment by reducing the system limitations detailed touched upon above.

However, the market leaders of read only memory products are failing to fully and strategically respond to this on-going revolution in consumer sophistication and to the advances in PC system power relative to the accessing and processing of digital storage media. The publishing industries in particular are essentially limited to manufacturing read only memory products as merely physically altered embodiments of selected artistic presentations, not unlike books-on-audio tape or VCR videotapes. These publishing entities have not yet realized the commercial value of producing music in its component form for entertainment and education and have not yet comprehended that advancements in PC processing power have enabled this type of publishing for the mass market.

Meaningful advances in the science and technology of audio digital recording are simultaneously changing the definition of what is achievable as regards maximizing the magnitude of output of the highest deliverable quality of musical reproduction from a finite storage capacity. Particular reference is made to U.S. Pat. No. 5,142,656, Fielder et al. (Dolby), wherein a transform based data compression/decompression algorithm is described. Certain implementations of the invention as disclosed in U.S. Pat. No. 5,142,656. Fielder et al. lend support for high quality audio data compression/decompression with compression ratios of 11 to 1 or more. The audio data demands of two channels of uncompressed digital audio data is 1.4112 Mb/s where a sample rate of 44.1 KHz and 16 bit data resolution is assumed. It can be dearly seen by one skilled in the art that by implementing the data compression method disclosed in U.S. Pat. No. 5,142,656. Fielder et al., six or more channels of digital audio data will fit in the bandwidth normally allocated for two channels of uncompressed digital audio data. However, this approach does not provide for user control of summation signals.

Transform coders, such as found in U.S. Pat. No. 5,142,656. Fielder et al., have previously been too expensive to succeed in the consumer PC market. The economics of putting digital signal processing hardware capable of implementing transform coding on currently available sound cards has been prohibitive to accommodate the needs of transform-based compression and decompression engines.

Because of the improvements in computing hardware generally and the implementation of certain microprocessors in particular, economical transform-based compression/decompression techniques are now feasible within these new improved architectures.

Current CD-ROM standards generally only specify limited and lower quality time domain-based techniques such as ADPCM. The CD-Bridge (White Book) discs allow MPEG 1 encoding of sound and video. MPEG is an advanced sub band coder the specification of which does not include user control.

Sony's MiniDisc product is the only example of the use of data compression on a special CD. It is limited to 2 channels and has no facilities for playing more than two channels or for mixing down multiple channels to a stereo output. It also uses a non-standard CD variation and is not compatible with CD-ROM players.

It is evident that the introduction of methods and PC systems that provide an effective use of data compression and decompression in the processing of data digitally stored on read only memory media (ROM) could significantly increase the utility of such ROM products and PC systems.

SUMMARY OF THE INVENTION

It is an object of the present invention to provide a method and apparatus to enable the consumer to modulate and mix digital data received from one or more sources.

Certain preferred embodiments of the present invention comprise one or more audio selections (e.g. songs, foreign language-specific audio dubs), where each audio selection further comprises synchronously related audio channels. One simple musical product example consists of a song selection consisting of four separate channels, such as a vocal channel, a guitar channel, a percussion channel and a saxophone channel. The four channels are synchronized in unison, and when played together produce a unified musical selection.

The consumer is allowed by the present invention to mute any and all of the channels of a selection. The end-user might, for example, choose to mute out the vocal channel, and sing along with the musical accompaniment of the three channels of musical instrument generated sound (as per the above example). Each channel's relative volume is established by the end user by means of control features of the present invention.

Certain preferred embodiments of the present invention retrieve the compressed data from a ROM source, modulates and mixes the accessed data in accordance with the directions and commands received from the operator or end-user, and creates a summation signal for presentation to an audience, a system operator and/or an end-user.

In an alternate embodiment of the present invention, an end-user selects a spoken language dialogue record from a ROM containing separate channels in which the dialogue of a synchronized video presentation is recorded in several language versions, and each channel uniquely contains dialogue in a specific language. The operator or end-user controls the presentation by directing the present invention to retrieve the channel containing the desired spoken language (e.g. French) from a plurality of channels and/or selections, each channel and/or selection being digitally stored in a ROM and containing audio recordings in one of several languages (e.g. a choice of French, Spanish, English, etc.).

Preferred embodiments comprising two or more foreign language dialogue alternatives are of special utility where separate vocal recordings of dialogue translated into a plurality of spoken languages are recorded for the same multimedia or audio-video presentation. Preferred embodiments of this type are especially useful for product distribution in the entertainment, broadcast, video and cinematic industries where inventory costs can be reduced by providing one product which meets the linguistic needs and preferences of several foreign markets.

Certain preferred embodiments of this multilingual dialogue content type permit the delivery of separate language dialogue to specified end-users in a pseudo-simultaneous flow from the same physical ROM. This capability helps movie and multimedia theaters to efficiently provide dialogue or narration as specified by individual customers who desire different language dialogue content during the same presentation.

Alternate preferred embodiments of the present invention further comprise the processing of data received from one or more external sources, such as an Internet link, a telecommunications pathway, a telephone line and/or a cable television or electric power line. This external data is, in certain preferred embodiments of the present invention, integrated with ROM sourced data into a summation signal. The exact nature of the summation signal is defined and controlled by the end-user. One example of preferred embodiments of these types is the synchronous audio presentation of an amateur musician's vocal or instrumental rendition of particular lyrics or a score of a song previously recorded on a CD-ROM. This Karaoke-like application is useful in wide areas of entertainment activities as well as in both vocational and academic musical education. Another example of these types of preferred embodiment is the integration of a new, Internet transmitted, version of a guitar score's contribution into a song selection of a consumer's previously purchased CD.

PC sound cards and/or PC data bus compatible data sources are used to generate ROM-external data for inclusion in the summation signal in certain preferred embodiments of the present invention.

In certain preferred embodiments of the present invention, a plurality of audio selections are written onto a CD-ROM in accordance with a Yellow Book standard CD-ROM format as data files. Each selection contains audio data in a compressed state. Alternate embodiments further comprise compressed video data, graphics data and auxiliary control information or any combination of these optional elements in the same file. A programmable computing element (PCE) is directed to read the data file containing the audio channels of the selection which are then stored in a memory device.

A PCE is routinely directed to de-compress and process the compressed audio data and to generate a summation signal by combining component channels of a selection at operator specified and/or default intensity values. Summation signals are generated from one or a plurality of combined channels. Each channel can be masked out or silenced entirely, or processed with one or more other channels in accordance with operator specified and/or default intensity values.

The summation signal of certain preferred embodiments is achieved via time domain techniques. After decompression has been completed, each audio channel is multiplied by the correct intensity values and then all the selected channels are added together. This is done on a sample-by-sample basis in time.

In alternate preferred embodiments, the summation signal is derived by executing modulation and mixing in the frequency domain. Audio compression is used, in certain (but not all) preferred embodiments of the present invention which comprise frequency domain processes, to convert blocks of time domain audio samples into an array of frequency bands, each having a value of magnitude. A summation signal created by modulation and mixing in the frequency domain is computed by the addition and scaling of each frequency band of a compressed audio channel resulting in a summation value for that specific frequency band. The frequency domain summation signal is then converted back to a time domain signal by an inverse of the transform used to encode each audio signal.

The PCE is a processing element which operates independently, or is an integral part of a PC, or is separate and acting in combination with a PC. Individual and parallel arrangements of Intel 80386 and 80486 processors, certain models of the Pentium family of microprocessors, and certain models found within the Motorola/IBM Power PC family of microprocessors are some examples of appropriate complex instruction set and reduced instruction set microprocessors which can comprise the PCE in various preferred embodiments of the present invention.

A separate PCE device is not fundamentally necessary for the implementation of the present invention in certain alternate preferred embodiments. Certain of these alternate preferred embodiments use a programmable digital signal processor (PDSP). The PDSP is be located on either a PC motherboard or on an external daughter card connected via the ISA/EISA or PCI or other applicable computer busses.

In certain preferred embodiments of the present invention, the operator-defined summation signal is stored in a memory circuit for later transmittal and/or immediate transmission to an external controller, a data bus or computer output peripheral.

In certain preferred embodiments of the present invention, digitized signals from an external source, such as an audio microphone, are integrated into the summation signal. Certain preferred embodiments of the present mode allow the playing of audio CD-ROM's in Karaoke-like applications, where an operator adds an independently generated musical score or his or her voice into the present invention for integration into a summation signal in combination with a plurality of modulated channels retrieved from a CD-ROM.

In certain preferred embodiments of the present invention, a record is made of a set of intensity values of a specific summation signal. This record is stored on the computer system hard disk or other digital data storage media. This feature of certain preferred embodiments of the present invention allows the operator to reproduce a previously developed summation signal, given access to the CD-ROM selection and the intensity value set record.

Certain preferred embodiments of the present invention further comprise system software operated by means of a personal computer (PC). The system software, in embodiments of the present invention of this type, allows an operator to set relative intensity values of each audio channel received from the CD-ROM. The system software further allows, in certain alternate preferred embodiments of this type, the user to add graphics, text, and video from external sources. The system software optionally allows the operator to set relative intensity values and summation directives to stereo output signal of audio channels from external sources. Graphical user interfaces, icons and/or menu selections are presented to the operator for communicating channel modulation, masking and/or external data integration in certain preferred embodiments of the present invention.

Certain preferred embodiments of the present invention comprising digital signal processing capabilities allow the operator to selectively execute various sound alteration effects such as reverb, echo, pitch shifting, equalization, chorusing, and flanging on audio data.

Certain preferred embodiments of the present invention allow for the inclusion of a plurality of compressed and/or uncompressed digital data signals from a remote source (e.g. an Internet source received via a modem) into the locally generated summation signal.

Certain preferred embodiments of the present invention allow for a plurality of compressed and/or uncompressed digital data signals to be received from a remote source via a modem, e.g. a data broadcasting cable television source, and summed via a local PCE to form a summation signal.

Certain preferred embodiments of the present invention further comprise specialized decompression methods to be utilized which allow a stereo source audio record to be partitioned into 8 segments. This method effectively converts a full length stereo (2 channel) audio element into a 16 channel audio element of ⅛th the time duration. For example, this technique would convert a 3 minute song into an 22 second music sample of 16 tracks. The 16 tracks are then time "slipped" relative to one another, and stacked on top of one another to form a 16 channel audio element. Compression encoding is then performed on the 16 channel audio element. Because of the time shifting of each channel relative to the other, there would be a minimum of correlation between any two channels. This technique has the advantage of allowing the maximum data compression ratios (e.g. 25 to 1) of multi-channel sources. Special note is made to Dolby Technical Publication number S93/9951 section 3 subheading F.

DETAILED DESCRIPTION OF A PREFERRED EMBODIMENT

The following detailed description of the present invention is meant to be illustrative only and not limiting. Other embodiments of this invention will be obvious to those skilled in the art in view of the following disclosure.

The detailed description disclosed herein is centered upon a preferred embodiment of the present invention in application in the field of electronic audio and multimedia entertainment delivery technology. Certain preferred embodiments of the present invention find application in providing economical, novel and inventive methods and electronic systems to the consumer market for use in making commercial quality sound mixes.

Figure 1:
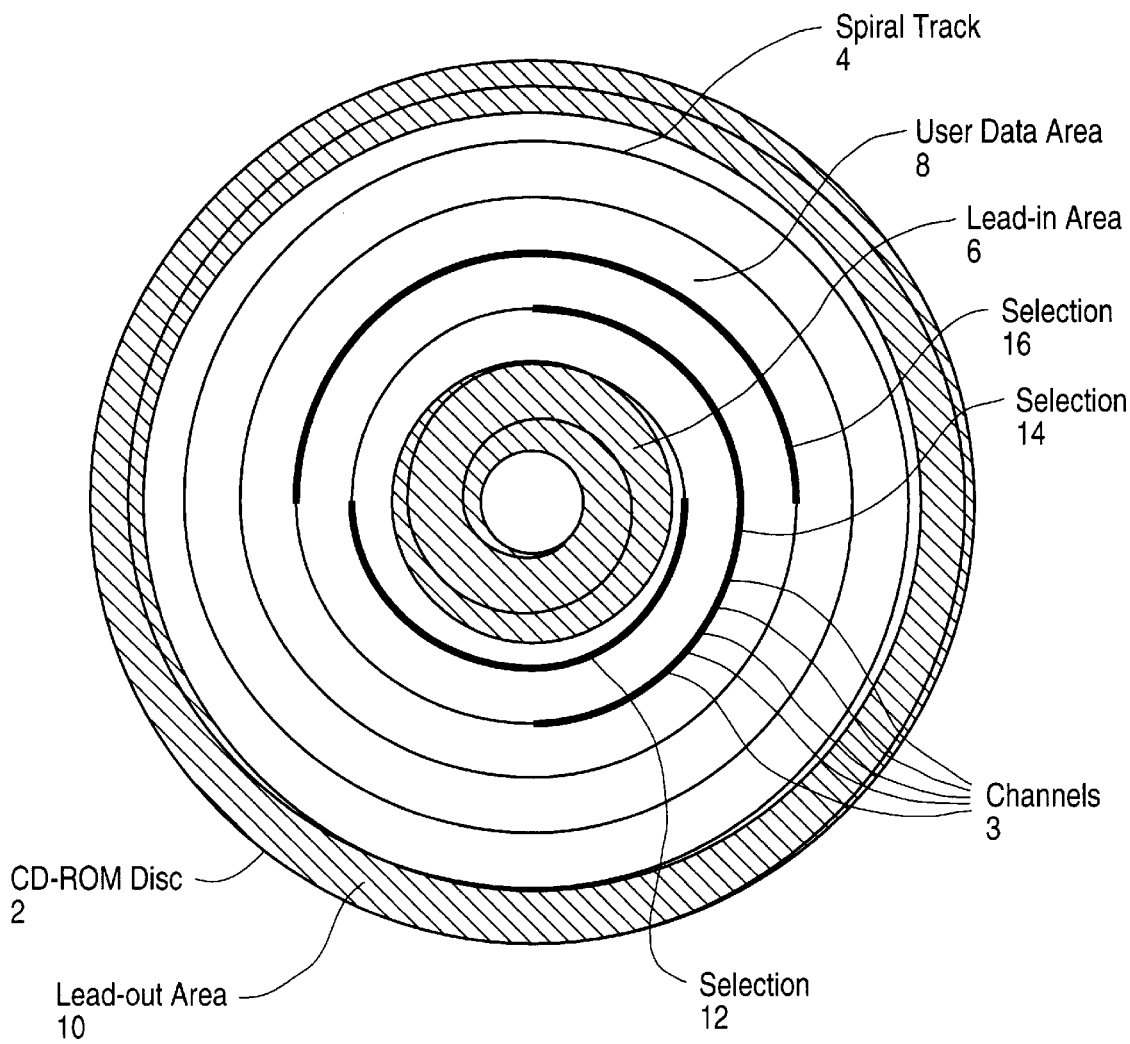
FIG. 1 depicts a CD-ROM.

Referring now to FIG. 1, a CD-ROM 2 is shown comprising a spiral track 4 throughout surface area of the CD-ROM 2. (The CD-ROM 2 disk is presented in FIG. 1 in the same perspective as read by reading laser of a CD-ROM player.) The term track is used herein to identify the entire physical spiral of data recording elements of a CD-ROM. This continuous physical track is logically subdivided into track indexes. It is helpful and clarifying to note that a CD-ROM 2 may contain one and only one track, under the usage of the word track as found in this document. Additional terms such as selection and channel are employed to identify subset components of the singular track of a CD-ROM. The term "channel" specifically defines a single unique audio stream. Each selection consists of one or more channels.

FIG. 1 further illustrates the division of track 4 into a lead-in area 6, a plurality of selections 12, 14, 16 that is referred to in the yellow book standard as the user data area 8, and a lead-out area 10. (The ISO/IEC 10149 standard allows for maximum of 99 selections.) Each selection 12, 14 and 16 comprises a plurality of individual channels 3.

The CD-ROM features mentioned above are defined in accordance with the ISO/IEC 10149 standard (yellow book) as applied in conventional CD-ROM disc formatting. The lead-in area 6 contains a table of contents or directory. The lead-in area 6 may optionally contain information as to the specific channel 3 formatting on each selection and allows for the later inclusion of additional, user specified information.

A directory file list or table of contents (TOC) is provided and stored in lead-in area 6, whereby all songs/selections 12, 14 and 16 are identified and their locations on the disk 2 are contained within directory file lists. In certain preferred embodiments of the present invention, each song/selection 12, 14 and 16 includes a header that informs a host computer/PC as to the number of channels 3, identifies the type of data of each channel 3 and leaves additional formatted data locations or digits for yet-to-be-determined future enhancements.

The information contained in the user data area 8 is data compressed audio information that is to be decoded from a binary pattern and translated into an audio output. The data is stored on a conventional CD-ROM 2 as computer data and not as linear audio. The audio data stored in the user area of the disclosed preferred embodiment is in a compressed digital audio form. Errors in reading the data can cause objectionable noises and distortions.

The preferred embodiment of the present invention as disclosed herein uses additional error correction that is impressed upon sectors using mode 1 for ISO/IEC 10149. In certain alternate preferred embodiments of the present invention mode 2 form 1 for CD-ROM/XA is used. It is possible to use data sectors in mode 2 for ISO/IEC 10149 and mode 2 form 2 for CD-ROM/XA for applications where occasionally erroneous data is acceptable or a data compression method is used that is tolerant of errors.

Data recorded on a CD-ROM 2 in certain preferred embodiments of the present invention is encoded according to the ISO/IEC 10149 yellow book CD-ROM standard. Encoding under this published standard facilitates easy and reliable reading of the CD-ROM by either conventional IBM-PC systems or Macintosh computers. It is significant to note that both Windows (Microsoft/IBM compatible) and System 7 (Apple/Macintosh) currently provide built in support for reading yellow book data from CD-ROM.

Various other types of read only removable media are used in certain alternate preferred embodiments of the present invention. The soon-to-be-available high density CDs are used in certain preferred embodiments of the present invention. Best mode embodiments of the preferred embodiment of the present invention which comprise read only memories and ROM drive hardware have the ability to transfer a minimum of 150K bytes per second from a ROM to a PDSP, PC and/or PCE and comprise removable read only media.

Figure 2A:
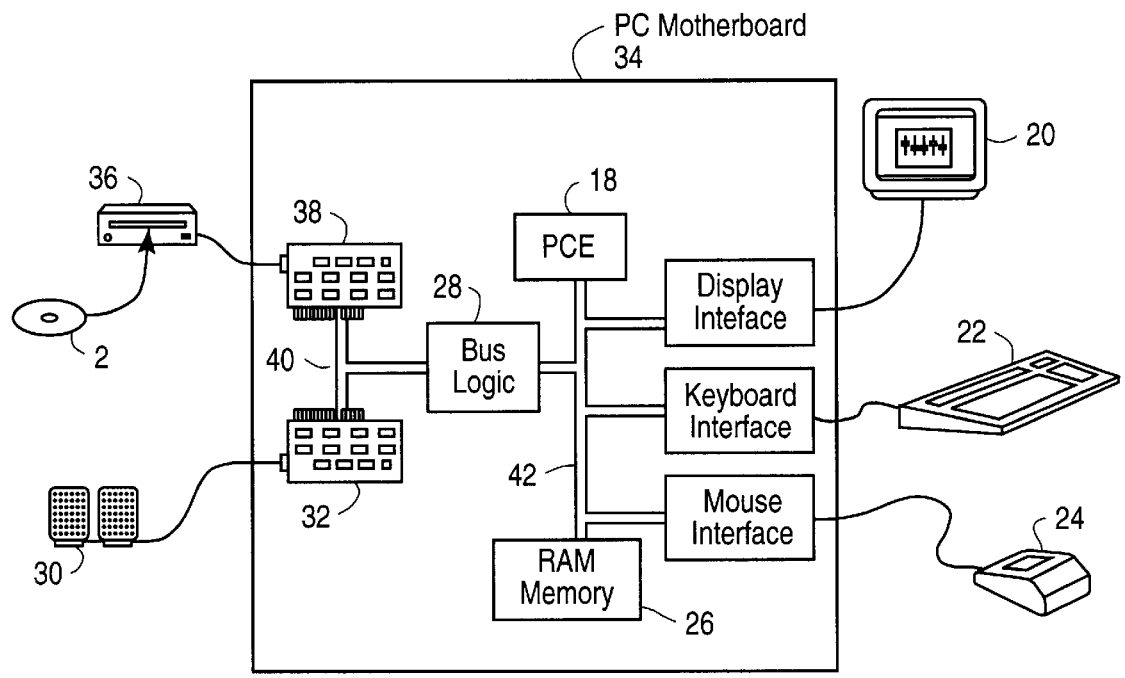
FIGS. 2A and 2B depict two alternate preferred embodiment of the present invention as disclosed below.

Referring now to FIG. 2A, a preferred embodiment of the present invention is disclosed as comprising CD-ROM 2, CD-ROM player 36, CD-ROM player interface card 38, sound card 32, PC motherboard 34, monitor 20, mouse pointing device 24 and speakers 30.

The preferred embodiment of FIG. 2A further comprises a programmable computing element (PCE) 18, memory 26, data bus 42, external bus interface logic 28 and external interface bus 40 in PC motherboard 34.

In all best mode preferred embodiments of the present invention comprising read only memory media, data compression is performed prior to writing the stored data onto the read only memory. A variety of data compression methods and algorithms are used to achieve this data compression. Certain preferred embodiments employ Dolby AC-3. Alternate preferred embodiments of the present invention use MPEG-II (ISO/IEC DIS 13818-3) and/or other audio compression methods. Additional software is provided to perform the summation of 6 or more decompressed audio signals from operator control of intensity levels. In all cases the data compression method used for encoding must be designed for compatibility with the data compression method for decoding.

Figure 2B:
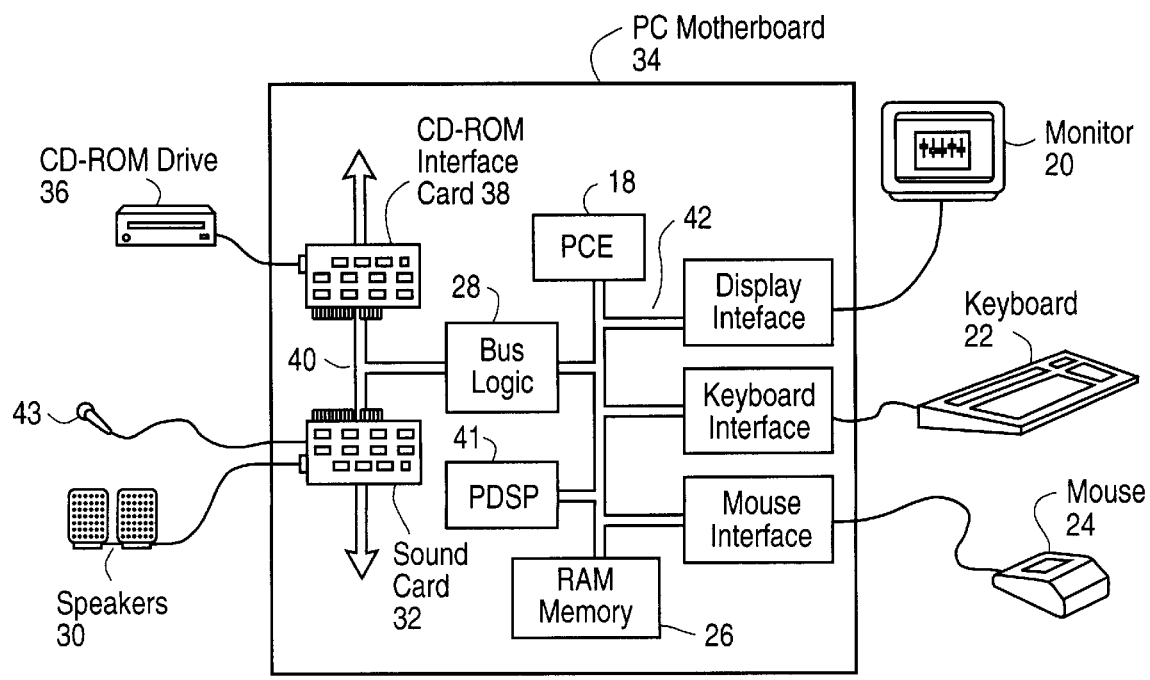

In FIG. 2B an alternate preferred embodiment is shown. A wide variety of commercially available personal computers are used in various preferred embodiments of the present invention. Certain preferred embodiments of the present invention use a general purpose programmable digital signal processor (PDSP) 41, whereas alternate preferred embodiments of the present invention use an applications specific digital signal processor (DSP). In embodiments and implementations utilizing a PDSP 41 for summation signal output 54 processing (see FIG. 3), the audio data decompression and summation is performed by PDSP 41 and all other operations are controlled by the PCE 18 or a host PC microprocessor.

In certain preferred embodiments of the present invention, where multiple DSP units are available or a single PCE 18 with sufficient processing speed is used, it is possible to decompress more than 6 channels 3 of audio and create a stereo summation signal output 54. In certain preferred embodiments of the present invention 16 or more channels 3 of decompression with summation to multiple stereo outputs are used.

Certain preferred embodiments of the present invention provide the operator or end-user with the additional capability to further control and define the summation signal output 54 by adding special effects, such as reverb, delay, chorusing, flanging, pitch shifting etc. if the necessary processing ability is available. Many effects are known within the art, numerous to the extent that it is not appropriate to include an exhaustive list in this document.

Certain preferred embodiments of the present invention provide external inputs 43 such as a microphone input from a plug-in sound card and/or from the host computers mother board.

FIG. 2 discloses CD-ROM 2 inserted into CD-ROM drive 36. The data of a user specified selection 12 or 14 or 16 is read, error detected and corrected by drive 36, and then transmitted to programmable computing element (PCE) 18, and/or memory circuit 26. Please note that memory device 26 can be a circuit found within a PCE 18, or off-chip from PCE 18, or may have sub-elements located on chip and off chip in relation to PCE 18.

Figure 3:
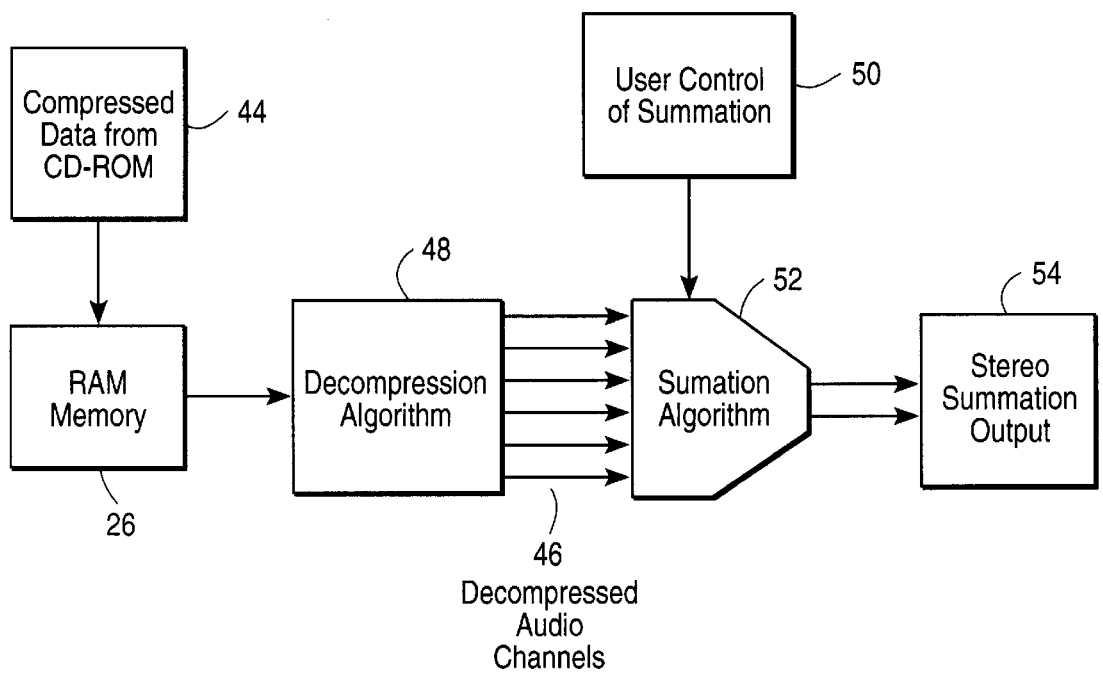
FIG. 3 depicts the decode/mixing process of the preferred embodiment of the present invention as disclosed below.

Referring now to FIG. 3, the data process flow of the preferred embodiment is illustrated, wherein compressed audio data 44, RAM storage 38, a decompression algorithm 48, a plurality of decompressed audio data channels 46 (resulting from the decompression of data retrieved from individual channels 3), a summation algorithm 52, user control data 50 for use in summation process and a summation signal output 54 are disclosed.

The data from the channels 3 of CD-ROM 2 is transmitted through CD-ROM player interface card 38 to RAM memory 26. The PCE 18 of the PC motherboard 34 then retrieves CD-ROM data of the channels 3 from memory 26 where it is processed into a summation signal output 54 by the PCE 18. The summation signal output 54 is sent to speakers 30 for listening by user.

PCE 18 is electrically connected to data bus 42, and communicates with RAM memory 26 through bus 42. PCE 18 processes special system instructions as read from RAM memory 26. These instructions direct PCE 18 to modulate the data of a user specified selection (such as 12 or 14 or 16) in accordance with the instructions received from the system operator by means of keyboard 22, or mouse 24, touch screen or light pen. (Please note that keyboard 22 and CRT screen 20 are electrically connected to bus 42, and communicate with PCE 18 through bus 42.)

The system operator reads user prompts of screen 20 and responds through keyboard 22 (or mouse 24, touch screen or light pen) in order to direct PCE 18 in the modulation, masking and combination of the information read from a user specified selection 12 or 14 or 16.

PCE 18 follows user generated instructions in requesting selection specification, channel 3 modulation values, masking and in introducing any input from external source into the integration of a selection 12, 14 or 16 by PCE 18.

PCE 18 produces a summation signal output 54 by modulating, masking and combining data transmitted from drive 30 and/or external source 52 and transmits the summation signal output 54 to either or both RAM memory 26 and/or data bus 42. Summation signal output 54 consists of a modulated combination of data derived from a user specified selection 12 or 14 or 16 and/or audio input from external source 52 as synthesized by PCE 18.

PCE 18 directs summation signal output 54 into speakers 30. At this point in the operating cycle of the disclosed preferred embodiment of the present invention, the present invention is actively presenting a personally customized mix of pre-recorded CD-ROM music. The system operator, can select to be combining an external audio with the summation signal output 54.

Certain preferred embodiments of the present invention allow the operator or end-user to archive the contents and/or modulation values of a particular and unique summation signal output 54.

Figure 4:
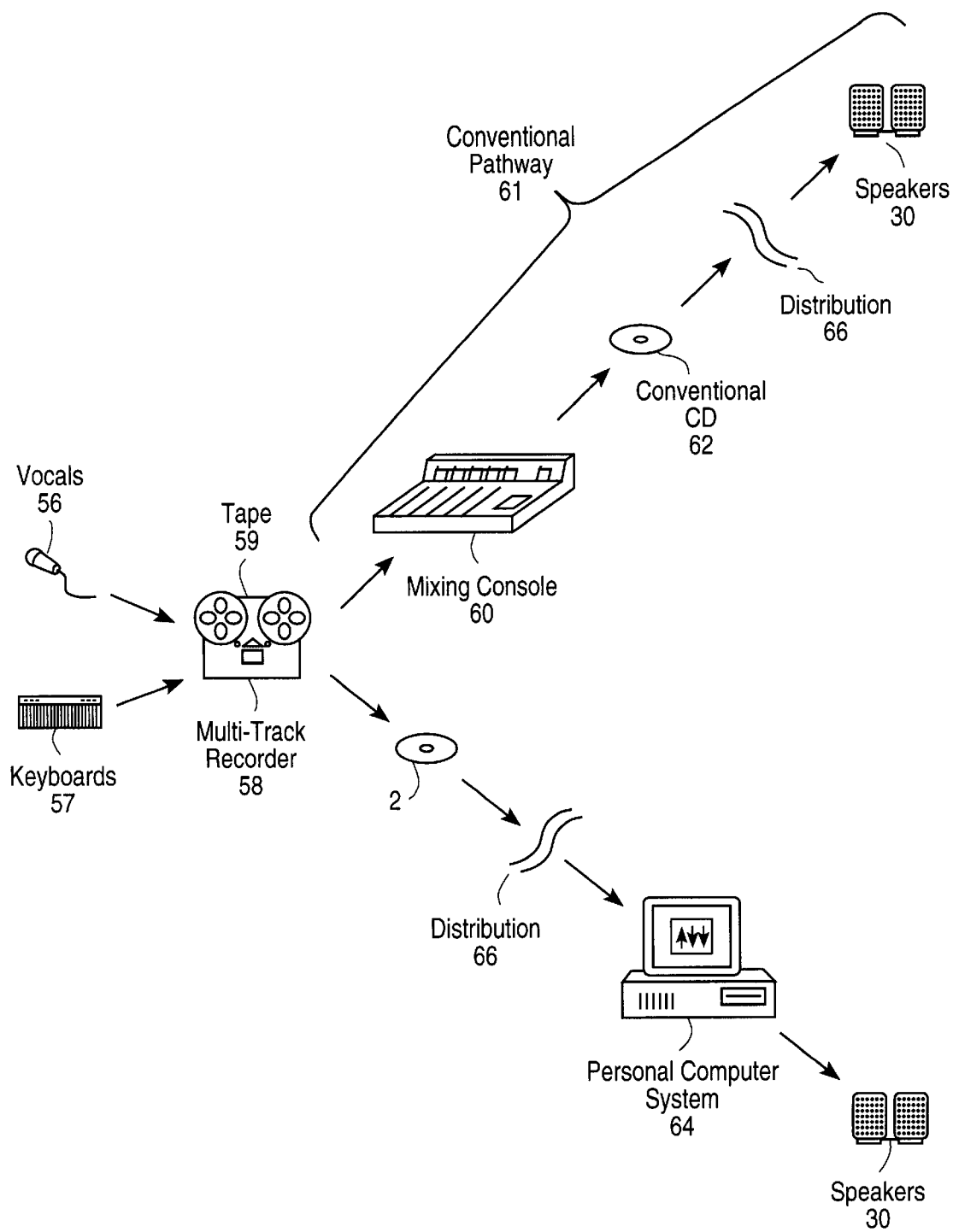
FIG. 4 depicts a comparison of the general music production process in comparison with the audio production process used in certain preferred embodiments of the present invention as disclosed below.

Referring now to FIG. 4, a comparison of a conventional pathway for audio mixing and consumer reproduction is illustratively compared with the disclosed preferred embodiment of the present invention.

The technique of the preferred embodiment of the present invention disclosed herein is meant to be merely and generally representative of the method of the present invention. Minor variations of the disclosed method of the preferred embodiment of the present invention are obvious to one skilled in the art in light of this disclosure.

In an alternate, but not illustrated, preferred embodiment of the present invention, for example, the actual media sent to a CD duplication facility is a Sony 1630 type tape cassette or a Digital Audio Tape (DAT) rather than a "red book" CD 62.

In the examples of FIG. 4 the original musical data is sourced from microphone 56 and keyboard 57 and separately recorded onto a tape 59 of multi-track recorder 58. In conventional art, and per conventional pathway 61, the separate recordings of tape 59 are transmitted to mixing console 60 where the musical data from microphone 56 and keyboard 57 are modulated and mixed (typically by an experienced audio engineer or technician) from typically 24 channels down to a stereo output (i.e. 2 channels). The resultant stereo music mix is recorded onto a master conventional red book CD 62. The master red book CD 62 is used to mass produce and distribute, as per step 66, commercially available red book CDs 62. In the conventional process of music CD manufacturing, CD's 62 are expected by the consumer to precisely reproduce the exact version of a particular musical mix.

FIG. 4 further discloses shows a novel and inventive aspect of present invention whereby a pathway is provided for audio mixing and reproduction. As disclosed in FIG. 4, original musical data is sourced from microphone 56 and keyboard 57 and separately recorded onto a tape 59 of multi-track recorder 58. In this preferred embodiment of the present invention, the separate recordings of tape 59 are encoded and recorded on to CD-ROM 2 where a plurality musical data channels 3 are stored. The CD-ROM 2 is played back by personal computer system 64 where the user controls the mixing of channels 3 down to a summation signal output 54 which is transmitted to speakers 30 for user presentation and enjoyment.

Certain preferred embodiments of the present invention provide for an alternate pathway to deliver digitally recorded data, to include discrete audio data types to a consumer by generating a CD-ROM 2 that contains a directory of lead-in area 6 and selections 10. The consumer can create customized mixtures of music by mixing the channels 46 of any selection 12 or 14 or 16 together in personal and/or multimedia computers 64.

The personal computer system 64 of FIG. 4 comprises all of the elements of FIG. 2A and optionally FIG. 2B.

The capability of the present invention to mute out any and all channels 3 and play any channel 3 in solo enables musicians to play along and carefully analyze and learn from world class recording artists. In certain preferred embodiments of the present invention, a system operator directs the host computer or PC to record his or her own musical data, and then mix it into a summation signal output 54 generated by the PCE 18.

The power of sound manipulation presented by certain preferred embodiments of the present invention allows the user to control the panning, intensity levels and special sound effects of each presentation of each selection.

Figure 5:
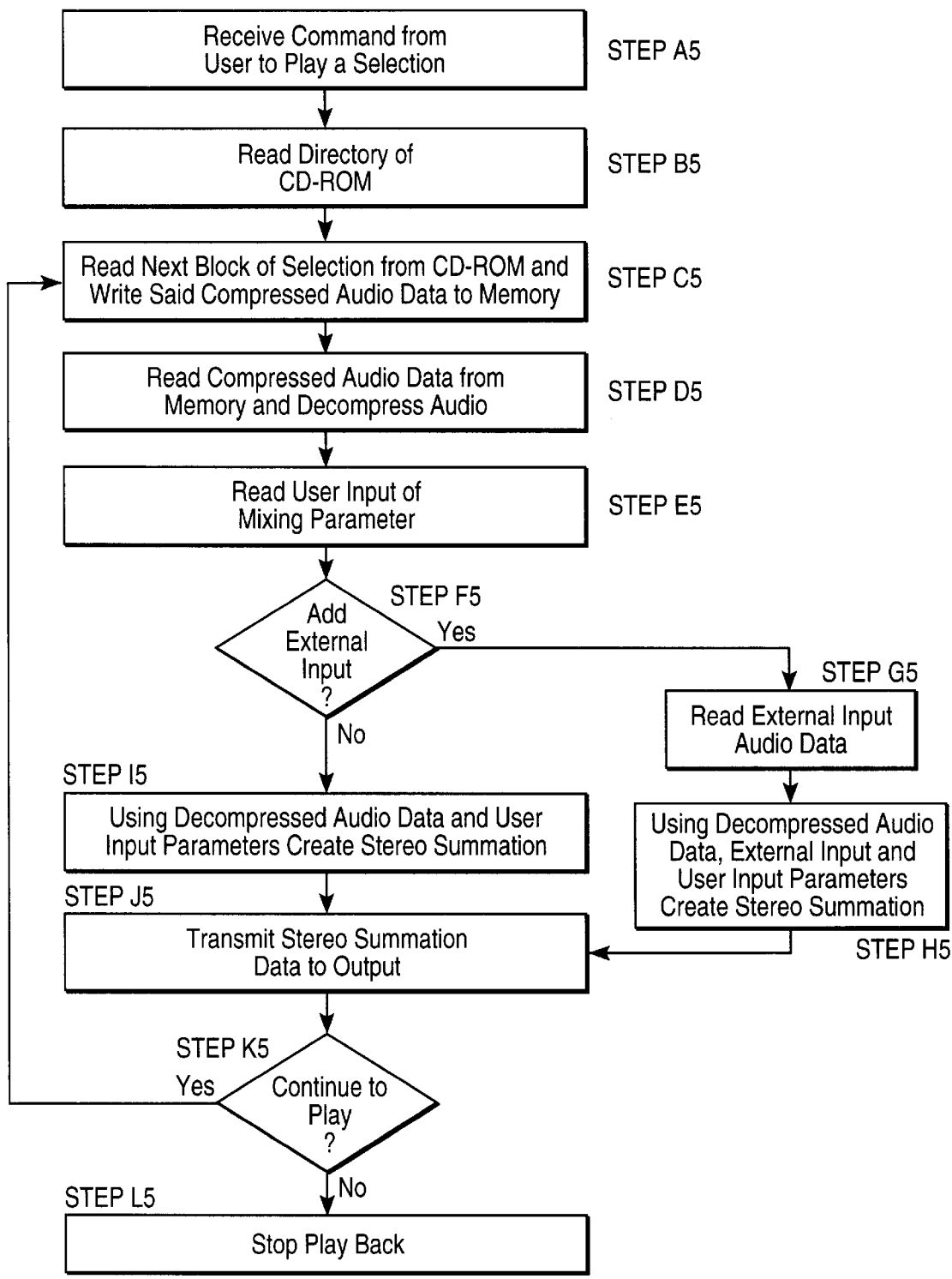
FIG. 5 depicts the system software flowchart of a preferred embodiment of the present invention as disclosed below.

Referring now to FIG. 5, a software flowchart of the system software of a preferred embodiment is disclosed. In step A5, the system software receives a command to access a specified selection.

In step B5 the system software queries the directory, or selection zero, of a CD-ROM 2 which has been formatted in accordance with the method of the present invention. Information about the location (found within the CD-ROM lead-in area 6) and duration of the selection are read from the CD-ROM 2 by the CD-ROM drive 36 and transmitted to the PC 64 at this time.

In step C5, the host computer directs the CD-ROM player 36 to start reading a block of compressed audio data from the starting location of the user selection 12, 14 or 16. The PC 64 receives the compressed audio data and stores it in RAM memory 26. The PC 64 keeps a record of the current block being accessed, including count and order of the blocks that have been read from the CD-ROM 2. Each time this step is executed the PC 64 updates the record of the current block, count and order of data read from the CD-ROM 2 concerning a particular selection 12, 14 or 16.

In step D5, the host computer then reads the compressed audio data from RAM memory 26 and initiates the decompression process.

In step E5 the PC 64 receives modulation, masking and other specific directions from an operator (or acts on default settings) regarding the exact parameters with which to direct the PCE 18 to create a summation signal.

In step F5 the PC 64 determines whether an external data source 43 is to be added to the summation signal output 54. If so, PC 64 branches to step G5 to receive this data and direct it to the PCE 18. The system software then moves on to step H5 and directs the PCE 18 to generate a summation signal output 54. The summation signal output 54 is directed for play or not as per step J5 as described below.

If no external data is to be included in the summation signal output 54, the system software directs the PCE 18 to create a summation signal in step I5.

A summation signal output 54 is then generated in step I5 as per the modulation levels, masking flags and default values.

In step J5 of FIG. 5, the summation signal output 54 is transmitted for either immediate and/or later presentation to the operator and/or an audience. A description of the full parameter set used to create a unique summation signal is stored in certain preferred embodiments of the present invention for later retrieval and use in reproducing a specific summation signal.

Finally in step K5 of FIG. 5, a decision is made to continue playback or go to the stop procedure. This decision is made on the basis of either user input to stop playback or the process has reached the end of the CD-ROM 2.

If the decision is to continue playback the procedure loops back to step C5.

If the decision is to discontinue playback the procedure goes to step L5.

In step L5, the procedure mutes the playback stream and stops data transfer from the CD-ROM. It also informs the user that the procedure has stopped.

The system software of certain preferred embodiments of the present invention allows the PC 64 to control the mixing function, the actual playback transmission, buffering of compressed data, mixing automation data and auxiliary data. The PC 64 also controls the recording of live or pre-recorded external input and mixing control (i.e. automation) data. These control functions are presented to the operator through a variety of windows, icons, menus, and/or graphical user interfaces as described below.

Certain preferred embodiments of the present invention further comprise a master mix, where the modulated and mixed output from the PCE 18 is based upon a set presentation as recorded and encoded at the time of the manufacture of the CD-ROM.

Certain preferred embodiments of the present invention further comprise a mixing automation function, whereby the operator records his movements to disk, and so enables the operator to build a "perfect mix" through repetitive passes and iterations. Mixing automation stores all control movements that the user initiates as time referenced to the playback. These would include changes to level, mixing and effects. The system stores the magnitude of the change and the time that the change is to occur. When mixing automation data is replayed, the control movements of the user are exactly mimicked in the correct time relationship to the music being played back. "Update" iterations of the mixing automation are allowed. This is where an automated playback is in progress and the user makes additional changes. The new user control data is recorded and overwrites the existing user data for that time period. The system smoothly segues between the recorded control information and newly input control information.

Figure 6:
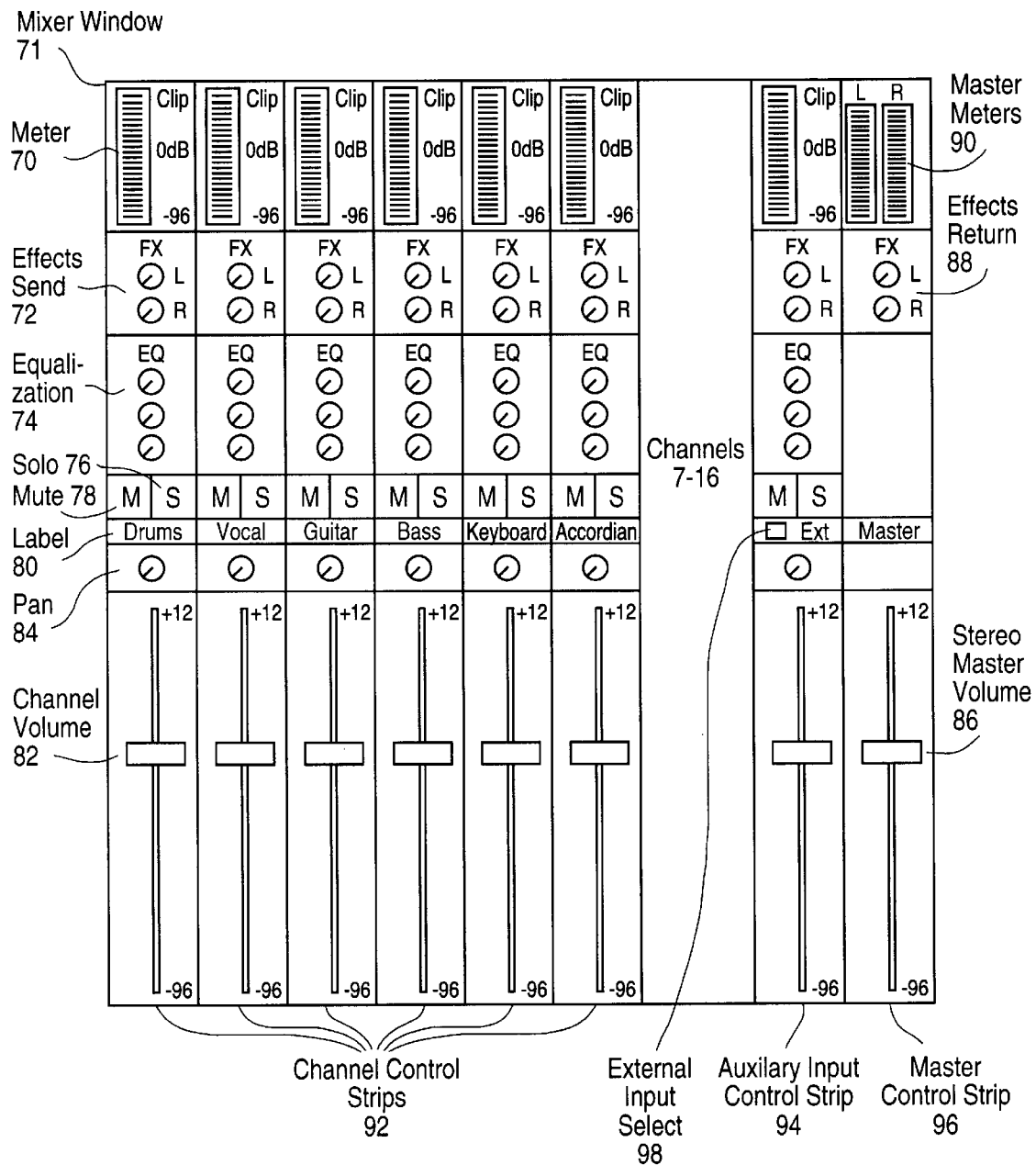
FIG. 6 depicts a system software screen containing the user interface of a preferred embodiment of the present invention as disclosed below.

Referring to now to FIG. 6, a preferred embodiment of a graphical user interface is disclosed wherein an on screen mixer window 71 with individual volume controls 82 (also known as "faders"), pan control 84, mute buttons 78, and solo controls 76. The system operator adjusts the on-screen mixing board controls using a host computer mouse 24 and/or keyboard inputs 22. The changes directed by the operator take effect immediately on the output of the CD-ROM 2 data reproduction. The graphical user interface of FIG. 6 emulates the essential elements of a professional mixing console.

The graphical user interface further comprises several discrete channel control strips 92 and one or more external/auxiliary source control strips 94 as well as a master control strip 96.

The function of the channel control strips 92 is to allow the user control of parameters such as volume, equalization, effects insertion, panning, muting and solo. The channel strip 92 controls and modulates decompressed audio data received from the CD-ROM. The channel strip 92 is provides the following functions:

a volume control 82 that controls audio level of the channel's contribution to the stereo summation signal 54, a panning control 84 that allows the user to balance the audio level of its channel between the left and right channels of the summation signal 54, a muting control 78 that allows the user to bring the channel's contribution to the summation signal 54 down to zero without touching the volume control 82, a soloing control 76 that allows the user to mute all channel strips 92 that do not have the solo button actuated, whereby the audio level intensity setting sent to the summation signal 54 of those channel strips 92 with the solo button actuated is typically unchanged but not implemented, equalization 74 is optionally provided, in certain preferred embodiments, to allow the user to attenuate or accent certain frequency bands while leaving others unaffected, an effects send 72 is optionally included, in certain preferred embodiments, to allow the user to transmit a portion of the audio channel level to an effects summation signal. The data from any channel designated by means of the effects send 72 is sent to an effects device whereby an effects signal is processed and the result is then inserted under control of the effects return 88 into the final summation signal, a metering display 70 is provided to allow the user to view the audio signal level, and a label 80 is provided to show the user the name of the audio channel being controlled.

The function of the auxiliary/external control strips 94 is identical to the channel control strip 92 with the exception that the auxiliary/external control strip 94 controls linear, digital and/or compressed audio data received from a hard disc, an Internet source, a telecommunications source, a telephone, cable or power line source or some other type of external source.

The master control strip 96 allows the user control of the final summation output. The master control strip 96 allows the user control of final stereo output level 86 and metering of the final summation signal via the master meters 90.

In certain preferred embodiments an effects return 88 is optionally provided to control the level of the effects signal combined with final summation signal.

Figure 7:
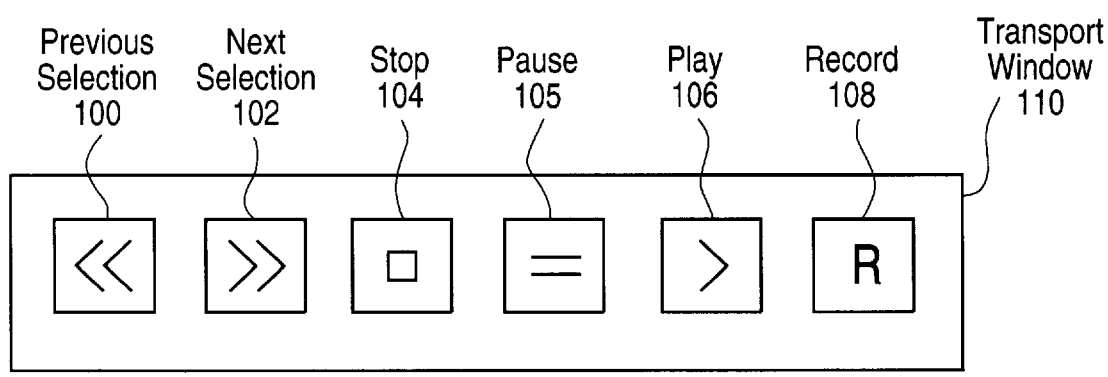
FIG. 7 depicts the transport window of the user interface.

Referring now to FIG. 7, the transport window 110 allows the user to control the playback of the CD-ROM 2. This transport window 110 presents controls analogous to the controls found on the control panel of a multi-track recorder (e.g. play control 106, record control 108, stop control 104 and pause control 105). The next selection control 102 and the previous selection control are analogous to a home music CD player.

The play control 106 initiates the start of the process of reading data from the CD-ROM and the associated processes of decompression, modulation, summation and output.

The stop control 104 aborts the play and record functions.

The pause control 105 when activated suspends the record and play functions. When de-activated the system resumes the last operation at its last location.

The record control 108 initiates the recording of an external input to a hard disk connected to the personal computer system. Once the record process is initiated it continues until either the stop control 104 is actuated or there is no space left on the hard disk.

The next selection control 102 allows the user to move forward to next selection. The previous selection control 100 allows the user to move back to the last selection. The controls are manipulated by means of clicking a mouse 24 and/or cursor commands from the keyboard 22 of the host computer.

Figure 8:
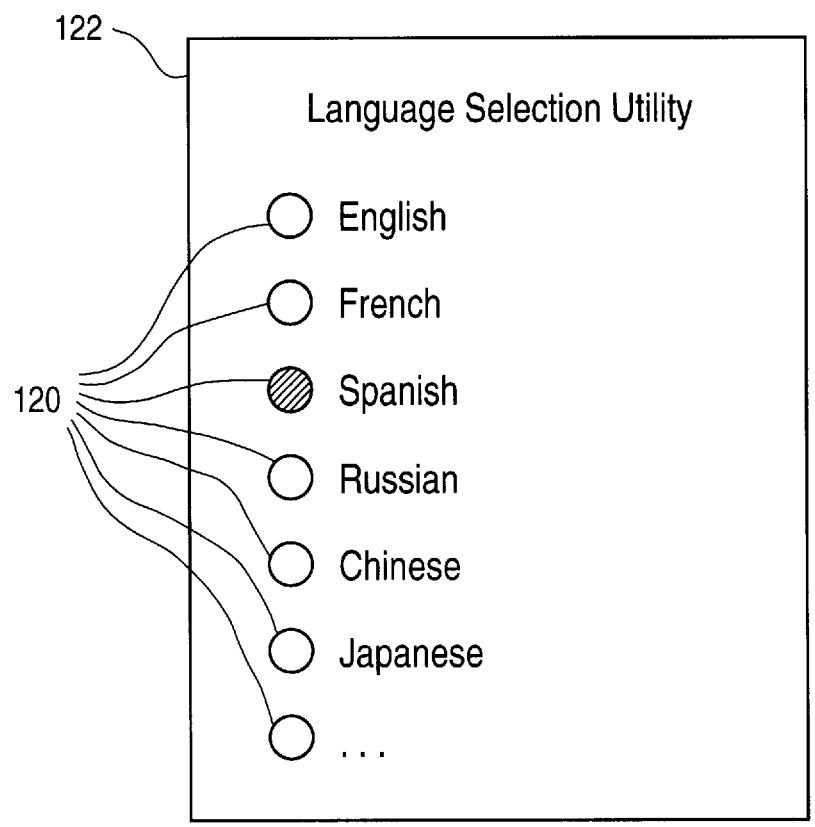
FIG. 8 depicts a menu presenting a multi-language selection utility.

Referring now to FIG. 8 a language selection utility 122 is disclosed. The language selection utility 122 is used in certain alternate preferred embodiments where it is desirable to have a plurality of audio in different languages. A CD-ROM 2 can contain a plurality of channels 3 that each contain a unique language. The language selection buttons 120 allow the user to select one of a plurality of languages to be played. The selected language would be played with unaltered or user established audio level while all other languages' audio levels would brought to zero.

Figure 9:
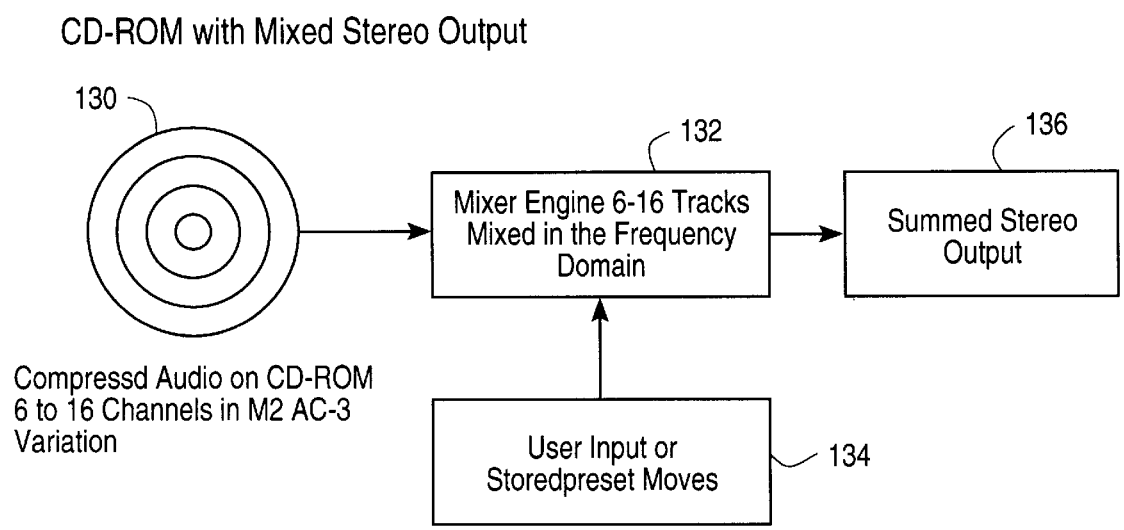
FIG. 9 depicts alternate preferred embodiment type A.

Referring now to FIG. 9, a diagram of alternate preferred embodiment type A is shown. In FIG. 9 a CD-ROM 130 containing up to 16 channels of compressed audio is shown. The compressed data from the CD-ROM 130 is decompressed and a stereo summation signal 136 is created in the frequency domain from user input and/or from stored user control 134. The summation signal is sent to the output of the system. This system comprises either general purpose PC or a system designed and dedicated specifically to this purpose.

Figure 10:
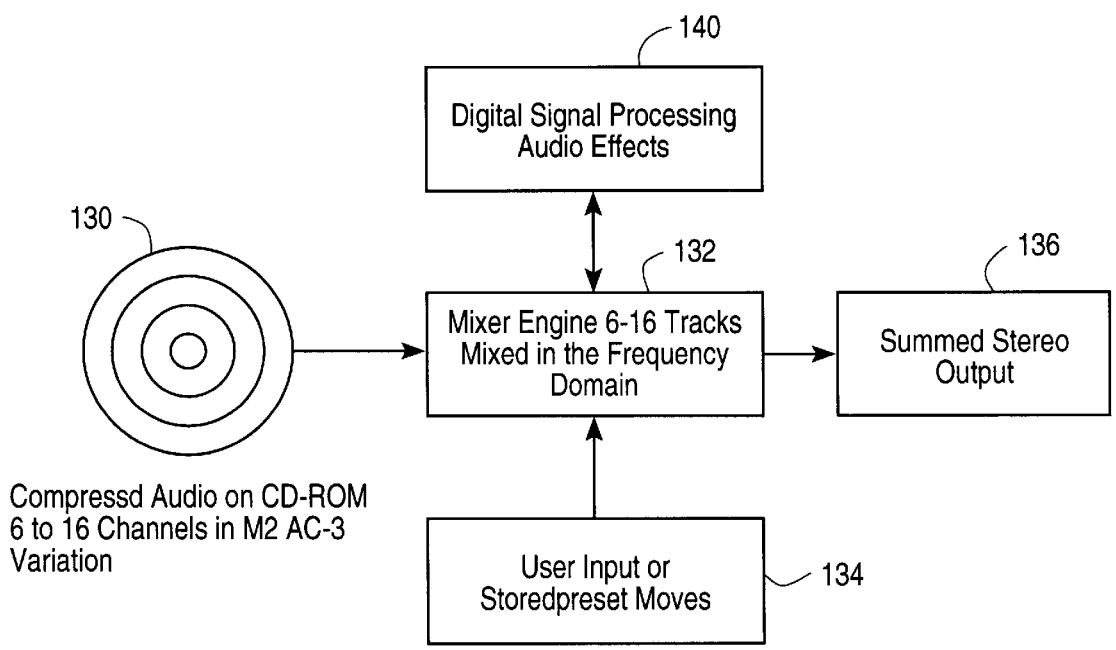
FIG. 10 depicts alternate preferred embodiment type B.

Referring to FIG. 10, a diagram of alternate preferred embodiment type B is shown. The system shown in FIG. 10 comprises all the elements of FIG. 9 with the addition of a digital signal processing unit 140 for special alterations to the summed stereo output 136.

Figure 11:
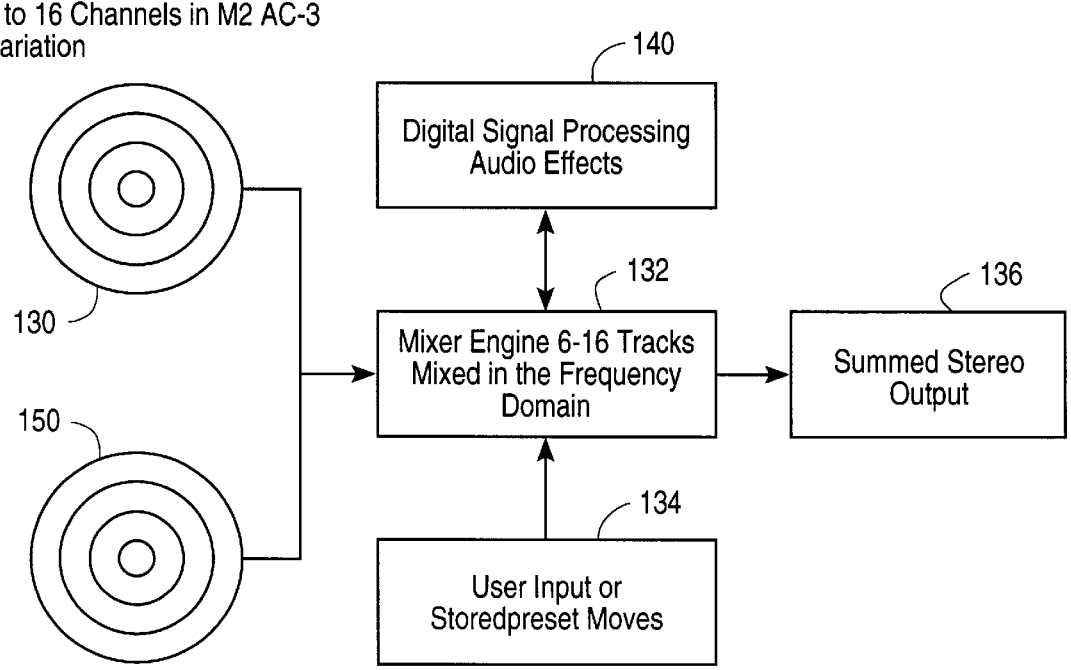
FIG. 11 depicts alternate preferred embodiment type C.

Referring to FIG. 11, a diagram of alternate preferred embodiment type C is shown. The system shown in FIG. 11 comprises all the elements of type B of FIG. 10 with the addition of playback of linear uncompressed audio from a hard disk 150 that is added to the summed stereo output 136.

Figure 12:
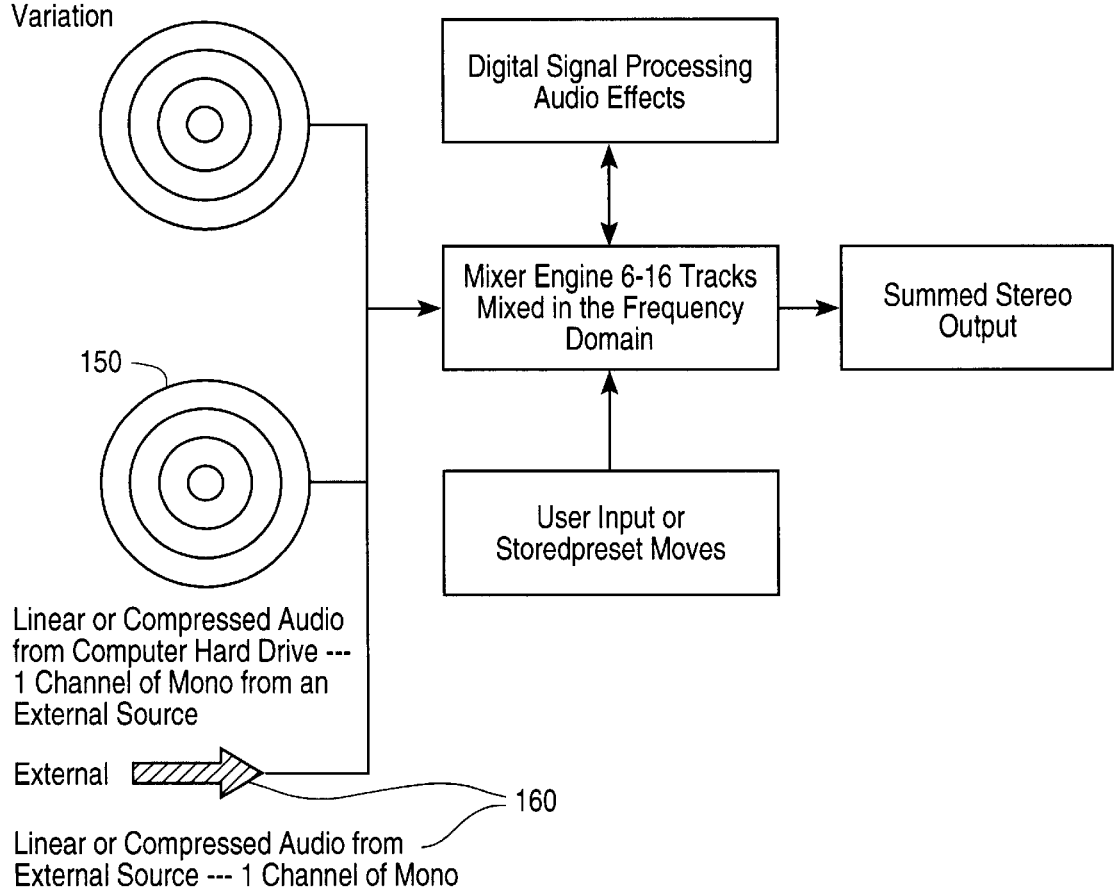
FIG. 12 depicts alternate preferred embodiment type D.

Referring to FIG. 12, a diagram of alternate preferred embodiment type D is shown. The system shown in FIG. 12 comprises all the elements of FIG. 11 with the addition of an input from an external source 160 that is added to the summed stereo output 136.

Figure 13:
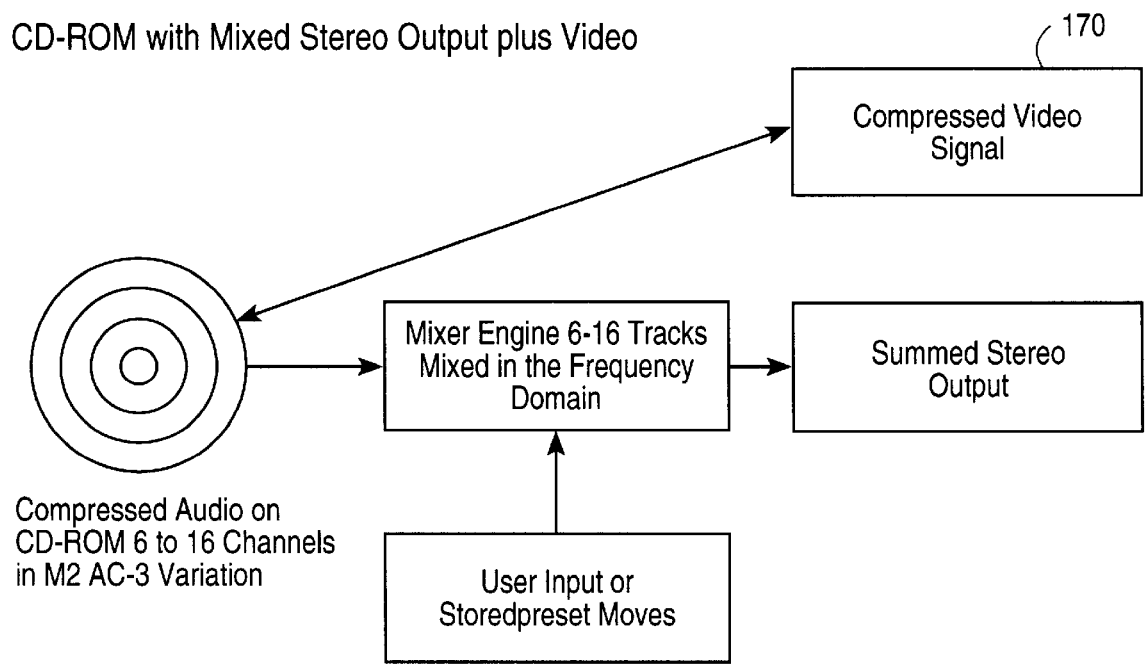
FIG. 13 depicts alternate preferred embodiment type E.

Referring to FIG. 13, a diagram of alternate preferred embodiment type E is shown. The system shown in FIG. 13 comprises all the elements of FIG. 9 with the addition of playback of compressed video 170 sourced from the CD-ROM 130.

Figure 14:
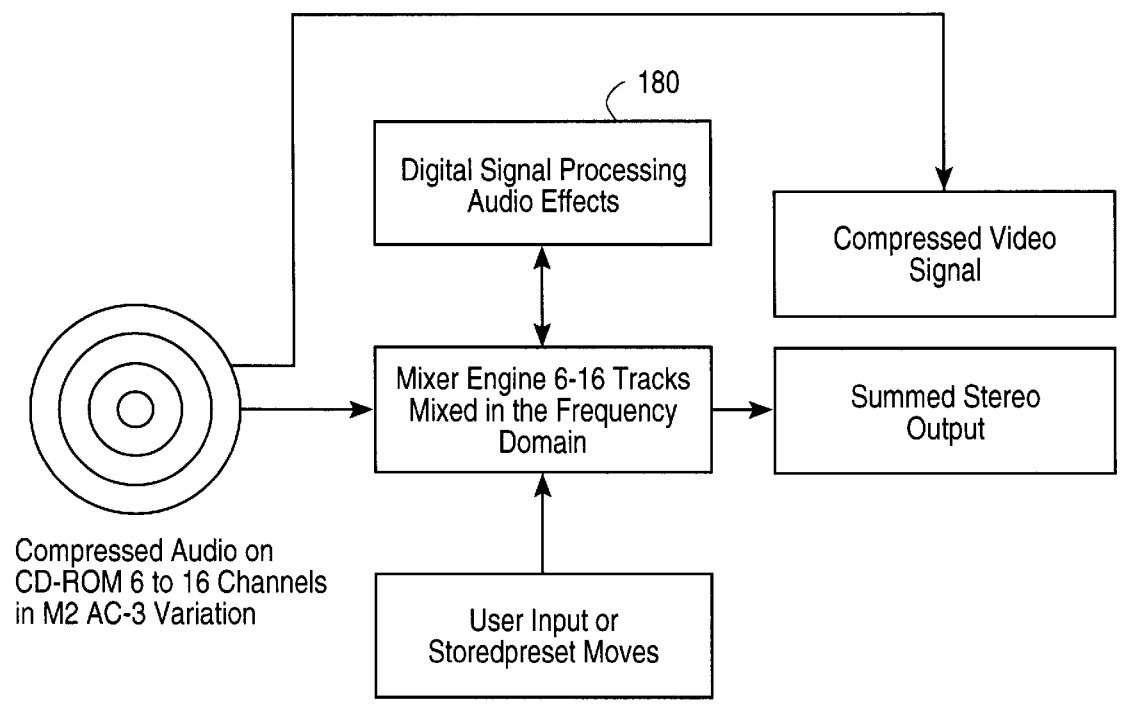
FIG. 14 depicts alternate preferred embodiment type F.

Referring to FIG. 14, a diagram of alternate preferred embodiment type F is shown. The system shown in FIG. 14 comprises all the elements of FIG. 10 with the addition of a digital signal processing unit 180 for special alterations to the summed stereo output 136.

Figure 15:
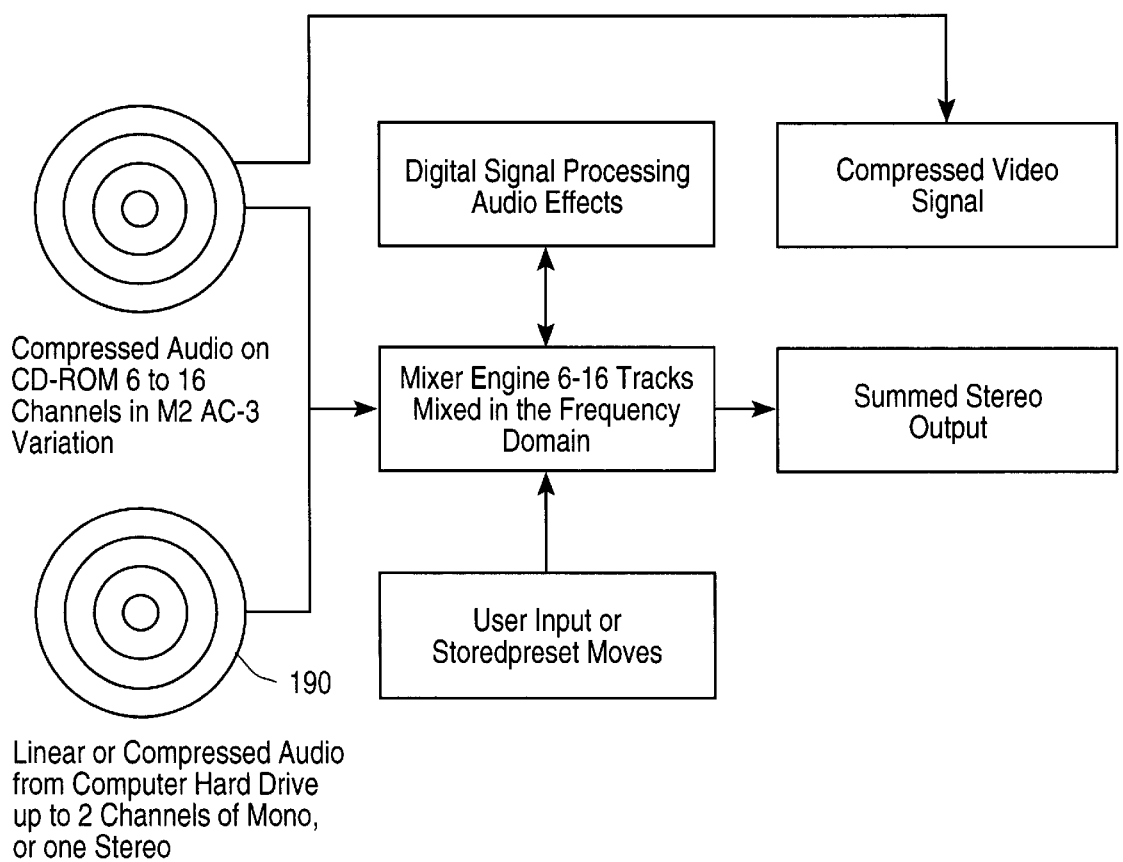
FIG. 15 depicts alternate preferred embodiment type G.

Referring to FIG. 15, a diagram of alternate preferred embodiment type G is shown. The system shown in FIG. 15 comprises all the elements of FIG. 11 with the addition of playback of linear uncompressed audio from a hard disk 190 that is added to the summed stereo output 136.

Figure 16:
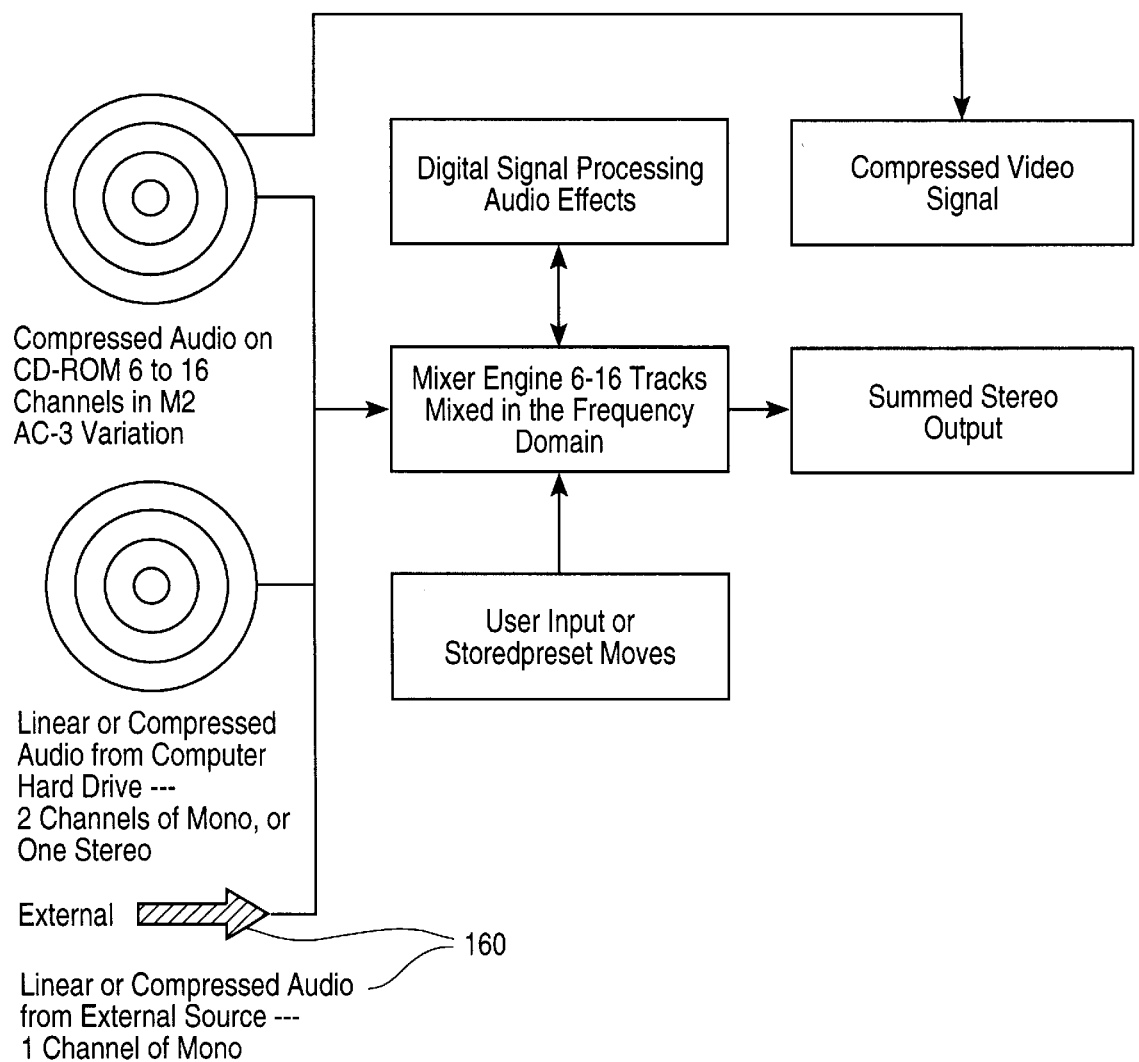
FIG. 16 depicts alternate preferred embodiment type H.

Referring to FIG. 16, a diagram of alternate preferred embodiment type H is shown. The system shown in FIG. 16 comprises all the elements of FIG. 12 with the addition of an input from an external source 160 that is added to the summed stereo output 136.

What is claimed is:

1. A read only memory data modulation system comprising:

a programmable computing element, the programmable computing element for receiving and decompressing a plurality of compressed, interleaved data channels of a read only memory selection, and for programmably generating a summation signal output combining the plurality of channels at intensity levels individually selected by an operator for each of the plurality of channels; and a first digital memory device having a fixed bandwidth data channel and in electrical connection with the programmable computing element, the first digital memory device for storing the plurality of compressed data channels of the read only memory selection in an interleaved format, and for transmitting the plurality of compressed, interleaved data channels to the programmable computing element, and for storing the summation signal as generated by the programmable computing element.

2. The system of claim 1, wherein the first digital memory device further comprises:

for each data channel, a time synchronized, arbitrarily varying intensity level signal, which is used by the programmable computing element to produce the summation signal.

3. The system of claim 1 wherein the programmable computing device receives as user inputs for selected ones of the data channels the arbitrarily varying intensity level signals, and produces the summation signal from the stored data channels in accordance with the received intensity level signals.

4. The system of claim 1 wherein the programmable computing element receives from a source external to the first digital memory device, the time synchronized, arbitrarily varying intensity level signals for selected data channels received from the first digital memory device.

5. The system of claim 1, further comprising:

a second digital memory device storing for each of data channels the time synchronized, arbitrarily varying intensity level signal, wherein the programmable computing device is coupled to the second digital memory device to receive the intensity levels and to produce the summation signal of the data channels.

6. A method of programmably modulating and combining a plurality of channels of a CD-ROM selection into a summation signal which comprises the steps of:

(a) individually recording each of the plurality of channels;

(b) establishing a format of the CD-ROM selection to individually contain a digital record of each of the recorded plurality of channels;

(c) digitally storing each of the plurality of channels onto a CD-ROM in accordance with the format of step (b);

(d) reading the plurality of channels from the CD-ROM; and (e) programmably generating a summation signal by combining the plurality of channels at individually selected intensity levels whereby an operator programmably selects the intensity levels of each of the plurality of channels and combines the plurality of channels at each of the programmable intensity levels to produce the summation signal.

* * * * *